July 19, 1966      R. L. CAVE      3,261,530
FOOD CONTAINERS
Filed July 6, 1964
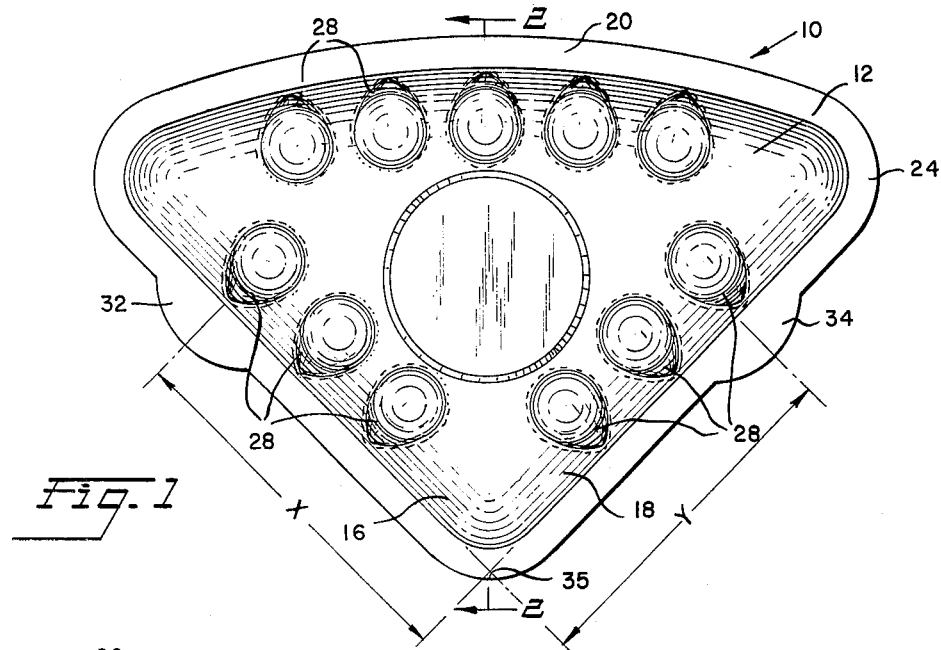
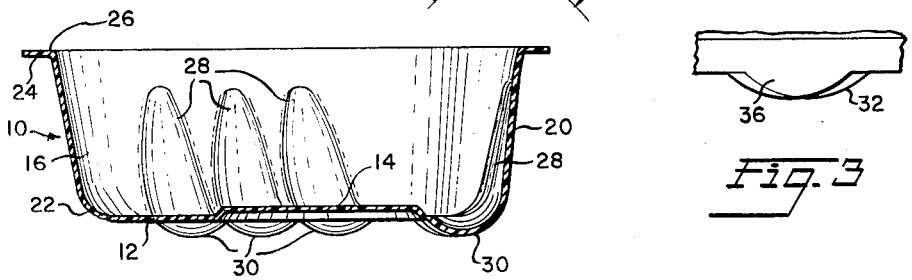 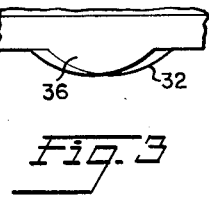
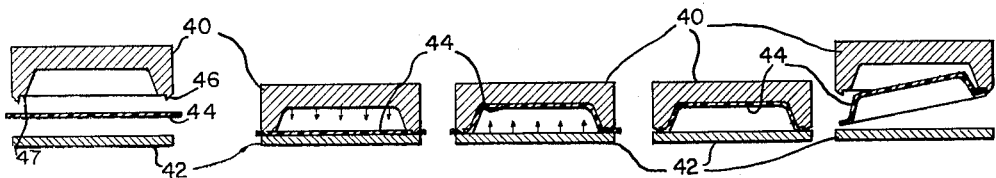
INVENTOR
ROBERT L. CAVE
BY *Strauch, Nolan & Neale*
ATTORNEYS

United States Patent Office 3,261,530
Patented July 19, 1966

3,261,530
FOOD CONTAINERS
Robert L. Cave, Manhattan, Kans., assignor to Buckeye Bait Corp., Council Grove, Kans., a corporation of Ohio
Filed July 6, 1964, Ser. No. 380,376
4 Claims. (Cl. 229—2.5)

The present invention relates generally to containers, and more specifically, to containers that are especially useful in the packaging, handling, preservation, and display for merchandising of food products such as sandwiches, pastries, salads, candy and the like in vending machines as well as over the counter sales as in cafeteria lines.

In the past, sandwiches and similar food products have frequently been packaged by flexible wrappings such as treated paper and plastic films. Food containers have also been made of opaque or non-transparent comparatively rigid materials such as polyethylene, and while desirable in many food merchandising applications, have not been successful for merchandising food products in vending machines and cafeteria lines for the reason that customers utilizing these facilities have in the past been unable to see the food product being purchased to be satisfied of its quality as indicated by appearance. The desirable container should therefore have the property of being transparent.

While many flexible wrappings have the requisite transparency, special procedures are required to wrap a sandwich so that an air and moisture proof seal is obtained. This prior type of packaging provides at best a limited shelf life for the packaged food because of the comparatively high gas transmission rate through the wrap material because of its thinness which, in the case for sandwiches, is normally regarded to be about six hours. In addition, this type of wrapping affords little, if any, protection against physical damage to the packaged food during handling in the kitchen and transport to the point of merchandising, and the package itself is susceptible to damage as by puncture.

Rigid containers have also been used to package, transport and merchandise food products. One type of prior rigid food product container consisted of a substantially transparent plastic box with a removable top and a square or triangular configuration. The snap-on type covers provided with such boxes did not effect an air and moisture proof seal with the box that was sufficient to materially extend the shelf life that was realized by the less expensive flexible wrappings, although these containers did minimize physical damage to the contents of the container.

These prior rigid containers, whether or not provided with an effective air and moisture proof seal and whether or not transparent, were generally formed from 0.050 inch or thicker plastic to obtain the requisite degree of strength and rigidity. The cost of manufacture of such prior containers and particularly for the material used therein, was so much that they could not be regarded as a single use item that could be thrown away after use which I feel is essential for successful packaging of items that are commonly sold in vending machines or in cafeteria lines. The cost of cleaning and handling such used containers to enable re-use together with the likelihood of breakage has made their use so costly in comparison with the value of the food products to be merchandised therein that there has not been widespread use of such containers.

It is accordingly the principal object of the present invention to provide a new and improved food container which embodies all of the foregoing advantageous features. By the present invention, I have incorporated into one container the properties of transparency, sufficient rigidity to provide mechanical protection to food contents in the kitchen and transportation to the point of merchandising, an air and moisture proof seal which will increase the shelf life of sandwiches to as much as 24 to 48 hours, and a configuration, shape and thickness such that the container is sufficiently inexpensive (i.e. a couple cents each) so that it will be a disposable item not intended for re-use.

To provide a food container incorporating all of the foregoing features, I have found that the best material presently available on the market is a biaxially oriented polystyrene. Styrenes are known to be inert to food products and are transparent. As the degree of polymerization increases, the physical strength of the material increases and I have found that maximum strength per unit cost based on present-day prices can be obtained by use of polystyrene that has been biaxially oriented. Such material is available in cylindrical rolls and thus provides flat sheet material having thicknesses from less than 5 mils to more than 20 mils from which to work.

Since the cost for plastic material such a biaxially oriented polystyrene, is almost directly proportional to its thickness, it is necessary that the sheet material have the minimum possible thickness in order to provide a unit cost per food container that is sufficiently low to enable its use on an economic basis for selling comparatively inexpensive items such as sandwiches that are customarily marketed in vending machines and cafeteria lines. In the present day economy, boxes of a sufficient size to accommodate sandwiches will become prohibitively expensive if formed from biaxially oriented polystyrene that has a thickness greater than about 0.015 inch.

Therefore, an important object of the present invention resides in providing a novel food container from a suitable transparent plastic material that has a thickness no greater than about 0.015 inch. While I have been successful in using thicknesses that are around 0.010 inch, and some even thinner, I have found that thicknesses below about 0.007 inch cannot be used because the corners of the container where greatest stretching occurs when the container is formed, become so thin as to have inadequate mechanical strength and also lose their resistance to the transmission through the material of gases and water vapor.

Another essential feature of the food container of my invention is that it must have a triangular configuration. If a rectangular or square configuration would be satisfactory for vending machines and cafeteria lines, many problems which I encountered in producing the food container of my invention would have never appeared. After having determined that for reasons pertaining to the merchandising of food in accordance with customary practices, a triangular configuration was required, the dimensions being determined by the size of a slice of bread when cut along a diagonal, I found that with the material I felt compelled to use, that the longest of the three sides of the container could not be made straight, but had to be made in the form of an arc. Only after experimenting with several dies did it become apparent that an arcuate shape was required for satisfactory operation of the die. Based on hindsight, it appears that the major source of difficulty resided in attempting to form a corner between two side walls where the angle was much nearer 45° than 90° as it is in a rectangular or square box.

It is therefore a further object of this invention to provide a novel food container having a triangular configuration wherein two side walls are disposed at right angles to each other and of substantially equal length and the third side wall is disposed along the arc of a circle having a radius that is about 50% longer than the outside dimension of my food container measured along the longest side wall, and further wherein the radii between adjacent side walls are at least about one-half inch.

Another feature of the present invention which aids in the dimensional stability of the container resides in the size, spacing and orientation of reinforcing protrusions that are formed in the side walls. While use of reinforcing scallops are customary in thin-walled containers such as shown in U.S. Patent No. D. 195,602, I have found for ease of operation of the die element as well as for the purpose of eliminating areas of concentrated stress which result in reduced thicknesses of the material at the corners for the container, that it is important the protrusions do not extend all the way to the corners. Instead, the protrusions are provided only along the mid-portion of wall sections away from the corners.

I have found by forming the walls of the protrusions to have a cylindrical shape with the diameter of the cylinders being on the order of one-half inch and the spacing between adjacent cylinder axes being about three-quarters of an inch, that added rigidity is provided at the same time the box falls more readily from the mold after it is formed.

As a further feature of the invention, the side walls are provided with a draft of approximately one-fourth inch, but the axes of the cylinders, the walls of which form the protrusions, are oriented to be perpendicular to the bottom plane of the container to thereby cause the protrusions to blend into and disappear at the upper portion of the side wall under the supporting flange. As the result of this construction, I have found wall thickness is nowhere less than 50% of the thickness of the starting sheet material, that the boxes are easier to manufacture with almost no rejections, and that there is greater dimensional stability around the upper portions of the box.

Yet another object of the present invention resides in providing a cover that is heat sealed to the bottom container member and tabs on each of the covers and containers that are slightly offset to be readily grasped and enable the cover to be readily removed from the container.

These and other objects will become more fully apparent from the claims, and from the description as it proceeds in connection with the drawings, wherein:

FIGURE 1 is a bottom plan view of a container in accordance with the present invention;

FIGURE 2 is a side elevation in section taken along line 2—2 of FIGURE 1 and shown with a flat cover that is positioned on the upper flange that surrounds the container to thereby form a gas and water vapor proof seal as by use of an adhesive or by application of heat to cause the thermoplastic material to seal together;

FIGURE 3 is a partial plan view showing the cover in place with a tab on the container being offset from the tab on the cover to thereby facilitate separation of the cover from the container;

FIGURE 4 is a diagrammatic view showing the molding machine with the die elements separated and the flat sheet material moved into place;

FIGURE 5 is a view showing the upper die element dropped into position on the lower die element to grasp the sheet material and place it in contact with the heating platen;

FIGURE 6 illustrates the step where the heated plastic material is forced into the mold cavity in the upper die element;

FIGURE 7 illustrates the step of cutting the molded container from the sheet material; and FIGURE 8 illustrates the step where the finished container is removed from between the die elements.

Referring now to FIGURES 1 and 2, the food container 10 of the present invention is formed of a transparent thermoplastic material, such as biaxially oriented polystyrene, that is non-reactive to the food products to be merchandised therein, and comprises a bottom 12 which may have a raised central circular region 14 and be joined to three side walls 16, 18 and 20 by a round 22 having a nominal radius of about three-eighths of an inch. Side walls 16 and 18 are generally perpendicular to each other and of equal length to accommodate a sandwich cut along its diagonal. The length of side walls 16 and 18 may conveniently be four and three-eighths inches and the other side 20 will be about six inches long. The height of side walls 16, 18 and 20 may be about one and seven-sixteenths inches, and may have a draft of about five-sixteenths inch to provide the desirable feature of nesting and to facilitate removal of the container from the female mold.

Around the upper edge of the three side walls is a flange 24 that provides added rigidity to the container. Flange 24 additionally serves as a surface to which a cover 26 may be secured. Cover 26 may be secured by an adhesive; or it may be sealed by heating the material to its softening temperature and applying pressure on the lower side of flange 24 and on cover 26 above flange 24 to provide a gas and moisture-proof seal. Such a seal increases the length of time that food products such as sandwiches may be stored in the container without objectionable aging or deterioration that occurs in unsealed packages.

A preferred seal is provided by pressing cover 26 against flange 24 with a machine that provides a line contact with the plastic material of both the cover and the container. Contact is made with opposed heated members that are designed so as to contact the entire periphery of the container at one time. The heated members are held in contact with the container for a time sufficient to cause softening and polymerization of a narrow region of the material in the cover and in the flange that surrounds the entire container to form a gas and moisture proof seal. Instead of the cover being flat, it may be composed of a second container identical to and inverted to fit over the lower container.

As pointed out above, of the plastic materials that are now available which can be safely used with food products, that are transparent, that can be molded into the shape of the container shown in FIGURES 1 and 2, and that are available at a price enabling such container to be thrown away after use, biaxially oriented polystyrene is preferred. Such material is available in the form of a continuous sheet on a roll of varying width and thicknesses. For economic reasons as pointed out above, the container of the present invention is characterized by being formed of a material having a thickness no greater than 0.015 inch and preferably a material having a nominal thickness of 0.010 inch is used. Sheet material having a thickness of as little as 0.007 or 0.008 inch may be used; but materials having thicknesses smaller than about this value cannot be used to form the container of the present invention. Because the cost of the sheet material is almost directly proportional to its thickness, the present invention contemplates the use of a minimum thickness commensurate with obtaining a container having adequate rigidity.

To improve the rigidity of the side walls, a series of protrusions 28 are provided in each of the side walls 16, 18 and 20. As is apparent from FIGURE 1, protrusions 28 have a generally circular appearance and the wall projecting outwardly along the side wall is substantially cylindrical. The axis of the cylinder providing the cylindrical wall is, in accordance with one of the features of the present invention, made vertical. Thus, the distance that the protrusion extends beyond the side wall's normal location varies as the protrusion approaches the upper flange 24. As best shown on the right-hand side of FIGURE 2, the wall 28 of the protrusion extends nearly vertically and blends smoothly with side wall 20 just below flange 24. Because protrusion 28 does not extend to the flange 24, there is less stretching in the lateral direction when the material is placed in the mold as will become apparent from the description in connection with FIGURES 4 through 8.

The size of protrusions 28 is also significant. I have found that by making the radius as much as one-quarter inch or slightly greater in the mold, that adequate stiffening is provided for the side walls. The distance between the axes of the vertical cylinders which form protrusions 28, is preferably about three-quarters of an inch, and no protrusion is located nearer a corner than a distance of approximately three-quarters of an inch. Thus, the number of protrusions on each side wall for a container having the dimensions as set forth contributes to the ease of manufacturing a satisfactory container.

Each of protrusions 28 extends below the surface of bottom 12 to thereby provide supporting surfaces at 30. Surfaces 30 are provided from a spherical section formed in the mold that has the same radius as is used to form protrusions 28. Supporting surfaces 30 thus raise the bottom 12 off the supporting table and provide means enabling air to circulate around the container which is desirable if the containers are stacked in a refrigerator or oven.

Referring now to FIGURE 3 and also to FIGURE 1, flange 24 may be provided with a tab 32 on side wall 16 and tab 34 on side wall 18. Cover 26 may be provided with a similarly shaped tab 36 as shown in FIGURE 3 which is offset from the mating tab 32. This construction has been found to be helpful in separating the cover from flange 24 even though there has been provided a gas and moisture proof seal under conditions which cause polymerization of the material of cover 26 with the material of flange 24. This feature is particularly desirable in instances where the food products are in a liquid or semi-liquid state and could spill when the cover is to be removed, and may be advantageously used with the line seal as discussed above.

Where the sealed container comprises two members each like that shown in FIGURE 1 with one placed on the other, tab 32 would necessarily mate with tab 34 on the other container. Thus, by locating tab 32 a distance X from apex 35 and tab 34 a different distance Y from apex 35, the difference between X and Y may serve as the offset illustrated in FIGURE 3 to facilitate separation of the cover member from the bottom member.

Referring now to FIGURES 4 through 8, the preferred method of manufacturing the container of the present invention is by use of a molding machine shown diagrammatically in these figures. Such machines are commercially available and contain upper and lower die elements 40 and 42 which separate to enable the flat sheet material 44 to be pulled therebetween without contacting either die element. The starting material is a flat, rectangular sheet of biaxially oriented polystyrene that has a thickness of approximately 0.010 inch.

Upper die element 40 consists of a mold having a cavity which determines the shape of the food container. A knife edge 46 forms the marginal peripheral edge of the container and surface 47 forms flange 24 on the container. Lower die element 42 is merely a flat platen and is provided with liquid channels (not shown) through which a heated liquid such as water is pumped to maintain lower die element 42 at its desired temperature. Upper die element 40 may have its temperature controlled by electrical resistance heating elements.

Minute air holes, not shown, are provided in each die element and extend throughout their surfaces. These air holes are connected together by a manifold (not shown) in the die element and connected via suitable valving arrangements and air lines to air pressure and/or vacuum tanks and to the atmosphere. It is therefore possible to force the sheet material 44 against the upper surface of platen 42 as shown in FIGURE 5 by applying air under pressure to the air holes in the upper die element and exhausting the air through the holes in the lower platen 42 to the atmosphere. And, by reversing air flow connections, the sheet material 44 can be forced upwardly against the interior surface of mold 40 as shown in FIGURE 6.

Referring now to FIGURE 5, the upper die element 40 is moved toward lower die element 42 with knife edge 46 forming a seal with the upper surface of sheet 44. Air under pressure is applied through the small apertures in the upper die element 40 and the apertures in the lower die element 42 are exhausted to the atmosphere or to a chamber having less than atmospheric pressure, to thereby force sheet 44 uniformly against the lower die element 42. The temperature of the lower die is sufficiently high, as for example, 260° F. as to soften the plastic material. The length of time required for sufficiently softening the material is only about one and one-quarter seconds.

At the end of the heating time period, the direction of air pressure is reversed to thereby force the softened sheet material into the mold contained in the upper die cavity. This is done without releasing the seal provided by the knife edge 46 with the upper surface of sheet 44. Since the sheet material 44 is not permitted to slip under the knife edges, the entire container is formed through stretching the material that is confined within the periphery of the knife edges 46. Because of this method of forming the container, the various shapes and dimensions as discussed above have a critical relationship in order that no portion of the finished container will have a wall thickness so thin as to destroy the effectiveness of the container. By the shape of the container I have devised, the wall thickness is nowhere less than about 50% of the thickness of the starting sheet material.

The temperature of the upper die element or mold 40 is about 150° F. and therefore cools the plastic material below its softening temperature to thereby cause it to harden into the configuration of the mold. The cooling time in the mold may be somewhat less than one second or about three-quarters of a second.

In the next step of the process as illustrated in FIGURE 7, the upper die element 40 is driven downwardly so that knife edges 46 cut through the plastic material and thereby separate the formed container from the flat sheet material. Thereafter, the upper die element 40 moves upwardly as illustrated in FIGURE 8 and advancement of the sheet material causes removal of the formed container from under the die element and a new section of flat plastic material located in a proper place for the next operation.

In a working embodiment, the upper die element is formed with four mold cavities so that four separate containers may be molded during each cycle of operation of the molding machine. The mold cavities are disposed in relation to one another so that as much as possible of the entire width of the sheet of plastic material is used to thereby minimize the per unit cost of each container.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A plastic food container of substantially uniform wall thickness throughout having:
  (a) a substantially flat bottom that is triangularly shaped with two sides that are disposed at right angles to each other and of approximately equal length and a third side which is longer than said two sides and arcuately shaped with the average radius of curvature of said arcuately shaped side being approximately 1½ times the length as measured exteriorly of the container of said third side; and
  (b) upstanding side walls that are joined integrally with the sides of said container bottom by a smooth radius and terminate in a flange that extends around the entire periphery of said container to provide rigidity to the container and serve as a means by which a cover can be sealed over the open top of said container;

(c) said container being formed from a flat sheet of transparent, thermoplastic material that is inert to the food to be placed therein having initially a thickness no less than 0.007 inch and no greater than 0.015 inch, and having all corners between the three side walls rounded with radii sufficiently large to provide dimensional stability and a minimum thickness throughout the entire container that is no less than one-half the thickness of the sheet material from which the container is formed.

2. The container as defined in claim 1 wherein the side walls extend upwardly at a small angle relative to a line perpendicular to the bottom to thereby provide nesting, and wherein the side walls are reinforced by outwardly extending protrusions that are in the shape of walls of cylinders, the axes of said cylinders being substantially perpendicular to said bottom and located so that the protrusion blends in with the upper region of the side wall and thereby disappears just below the flange.

3. The container as defined in claim 2 wherein said protrusions terminate at said bottom in an outwardly extending spherical portion, part of which extends below the adjacent bottom to thereby form supporting portions when the container rests on a horizontal surface, and a center region of the bottom is recessed upwardly about the same distance as said supporting portions extend downwardly to enhance air circulation about the container.

4. The container as defined in claim 2 wherein the sides of equal length are about four inches long and each contains only three protrusions centered along said side, the radius of each protrusion being about ¼ inch and the spacing between the center lines of adjacent protrusions being about ¾ inch, and wherein said longer side contains exactly five protrusions of similar size and spacing.

References Cited by the Examiner

UNITED STATES PATENTS

| | | | |
|---|---|---|---|
| D. 178,537 | 8/1956 | Rauch | D44—15 |
| D. 195,602 | 7/1963 | Bostrom | D58—17 X |
| D. 201,644 | 7/1965 | Cave | D58—12 |
| 2,506,256 | 5/1960 | Waldo | 206—4 |
| 3,095,133 | 6/1963 | Vogt | 229—2.5 |
| 3,104,776 | 9/1963 | Bostrom | 229—2.5 X |
| 3,140,807 | 7/1964 | Bostrom | 229—2.5 X |
| 3,164,478 | 1/1965 | Bostrom | 229—2.5 X |

FOREIGN PATENTS

| | | |
|---|---|---|
| 456,281 | 5/1949 | Canada. |

JOSEPH R. LECLAIR, *Primary Examiner.*

D. T. MOORHEAD, *Assistant Examiner.*